(12) United States Patent
Otsuka et al.

(10) Patent No.: US 10,434,450 B2
(45) Date of Patent: Oct. 8, 2019

(54) OIL CATCH APPARATUS

(71) Applicant: Bendix Commercial Vehicle Systems LLC, Elyria, OH (US)

(72) Inventors: Hiroki Otsuka, Sakado (JP); Hiroki Takahashi, Sakado (JP); Takeshi Yokoyama, Sakado (JP)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 243 days.

(21) Appl. No.: 15/524,649

(22) PCT Filed: Oct. 1, 2015

(86) PCT No.: PCT/JP2015/077960
§ 371 (c)(1),
(2) Date: May 5, 2017

(87) PCT Pub. No.: WO2016/072183
PCT Pub. Date: May 12, 2016

(65) Prior Publication Data
US 2017/0340997 A1    Nov. 30, 2017

(30) Foreign Application Priority Data

Nov. 6, 2014 (JP) .................. 2014-226102

(51) Int. Cl.
*B01D 46/00* (2006.01)
*B01D 39/08* (2006.01)
(Continued)

(52) U.S. Cl.
CPC ......... *B01D 46/0031* (2013.01); *B01D 39/08* (2013.01); *B01D 39/083* (2013.01);
(Continued)

(58) Field of Classification Search
CPC .. B01D 46/003; B01D 46/0031; B01D 46/24; B01D 46/2403; B01D 46/2411;
(Continued)

(56) References Cited

U.S. PATENT DOCUMENTS

2004/0118092 A1\* 6/2004 Tran .................. B01D 46/0031
55/423
2016/0001758 A1   1/2016 Sugio

FOREIGN PATENT DOCUMENTS

| CH | 505 639 A | 4/1971 |
| CN | 1502396 A | 6/2004 |

(Continued)

OTHER PUBLICATIONS

Extended European Search Report issued in counterpart European Application No. 15857689.2 dated Jun. 6, 2018 (six (6) pages).
(Continued)

*Primary Examiner* — Robert Clemente
(74) *Attorney, Agent, or Firm* — Crowell & Moring LLP

(57) ABSTRACT

An oil catch apparatus is provided. The oil catch apparatus is capable of efficiently extracting oil from air flowing through the oil catch apparatus while being of compact size. A filter of the oil catch apparatus includes a cylindrically wound main filter unit and a keep member for keeping both ends of the main filter unit. Air flowing into the main filter unit is cleared of impurities upon passing through the main filter unit, and exits out of the main filter unit.

6 Claims, 5 Drawing Sheets

(51) Int. Cl.
*B01D 39/12* (2006.01)
*B01D 39/16* (2006.01)
*B01D 46/24* (2006.01)
*F04B 39/16* (2006.01)

(52) U.S. Cl.
CPC .............. *B01D 39/12* (2013.01); *B01D 39/16* (2013.01); *B01D 46/24* (2013.01); *F04B 39/16* (2013.01); *B01D 2239/0695* (2013.01)

(58) Field of Classification Search
CPC ...... B01D 39/08; B01D 39/083; B01D 39/10; B01D 39/12; B01D 39/16; B01D 2239/0695; F04B 39/16
See application file for complete search history.

(56) References Cited

FOREIGN PATENT DOCUMENTS

| CN | 2765657 Y | 3/2006 |
|---|---|---|
| CN | 201253508 Y | 6/2009 |
| GB | 1 235 322 A | 6/1971 |
| JP | 50-21181 | 3/1975 |
| JP | 6-34722 U | 5/1994 |
| JP | 6-63116 U | 9/1994 |
| JP | 2004-58002 A | 2/2004 |
| JP | 2007-130560 A | 5/2007 |
| JP | 2013-174224 A | 9/2013 |
| WO | WO 2014/133035 A1 | 9/2014 |

OTHER PUBLICATIONS

Chinese-language Office Action issued in counterpart Chinese Application No. 201580070058.6 dated Oct. 31, 2018 with English translation (11 pages).
International Search Report (PCT/ISA/210) issued in PCT Application No. PCT/JP2015/077960 dated Dec. 22, 2015 with English translation (5 pages).
Japanese-language Written Opinion (PCT/ISA/237) issued in PCT Application No. PCT/JP2015/077960 dated Dec. 22, 2015 (4 pages).

\* cited by examiner

OIL CATCH APPARATUS

CROSS REFERENCE TO RELATED APPLICATIONS

This application is a National Stage of PCT International Application No. PCT/JP2015/077960, filed Oct. 1, 2015, which claims priority under 35 U.S.C. § 119 from Japanese Patent Application No. 2014-226102, filed Nov. 6, 2014, the entire disclosures of which are herein expressly incorporated by reference.

TECHNICAL FIELD

The present invention relates to a technical field relating to an oil catch apparatus disposed in piping for air passage and separating water, oil, impurities, and the like mixed in the air.

BACKGROUND ART

There are conventionally known vehicles that control a system, such as a braking system, using compressed air fed from a compressor. The compressed air may contain oil for lubricating the inside of the compressor. If the oil enters the system, malfunction may occur.

In order to prevent the oil from entering the system, it is preferable to separate and collect the oil using a product called APU (Air Processing Unit). However, the oil that the APU collects for maintenance of performance is discharged outside. The discharge of the oil is problematic in terms of environmental preservation. To cope with this, there is disclosed an oil catch apparatus that separates impurities temporarily collected by an oil catch part and exhausts only the air outside (see Patent Document 1).

CITATION LIST

Patent Document

Patent Document 1: JP 2013-174224A

DISCLOSURE OF THE INVENTION

Problems to be Solved by the Invention

The oil catch apparatus described in Patent Document 1 has a structure that separates the oil and recovers the same by making air containing the oil collide with a collision plate. Thus, it is necessary to ensure a distance for making the air collide with the collision plate, resulting in an increase in the apparatus size.

The present invention has been made in view of the above situation, and an object thereof is to provide an oil catch apparatus capable of extracting a sufficient amount of oil albeit being of compact size.

Means for Solving the Problems

To solve the above problem, an oil catch apparatus according to an embodiment of the present invention includes: a main unit; a lid that covers the opening in the main unit; a hose that is attached to the lid; a filter that is located inside of the main unit; and a buffer that supports the filter. The filter includes a cylindrically wound main filter unit and a keep member that keeps both ends of the main filter unit. Air flowing into the main filter unit is cleared of impurities upon passing through the main filter unit, and then exits from a peripheral surface of the main filter unit.

Further, in the oil catch apparatus according to the embodiment of the present invention, the main filter unit is formed by winding a network stainless material cylindrically and has inside a polyester mesh.

Further, in the oil catch apparatus according to the embodiment of the present invention, the buffer includes a buffer member formed in such a way as to cover up a portion of the main filter unit on a side opposite to an air inflow side.

Further, in the oil catch apparatus according to the embodiment of the present invention, the main unit includes an exhaust opening for an air exiting from the peripheral surface of the main filter unit for clearance of impurities, and the lid includes an inlet into which an air flows and a drain outlet out of which the impurities are drained.

Further, the oil catch apparatus according to the embodiment of the present invention further includes a cylindrical member that is attached to the lid. One side of the cylindrical member is coupled to the drain outlet and the other side of the cylindrical member is detachably mounted on a stop formed on the lid.

Advantages of the Invention

To solve the above problem, an oil catch apparatus according to an embodiment of the present invention includes: a main unit; a lid that covers the opening in the main unit; a filter that is located inside of the main unit; and a buffer that supports the filter. The filter includes a cylindrically wound main filter unit and a keep member that keeps both ends of the main filter unit. Air flowing into the main filter unit is cleared of impurities upon passing through the main filter unit, and then exits from a peripheral surface of the main filter unit. Thus, the oil catch apparatus can extract a sufficient amount of oil albeit being of compact size.

Further, in the oil catch apparatus according to the embodiment of the present invention, the main filter unit is formed by winding a network stainless material cylindrically and has inside a polyester mesh. Thus, it is possible to efficiently separate and collect the oil and the like within a limited space. Further, using the stainless material allows the filter to be manufactured at low cost. Further, using the mesh makes it possible to enhance muffling effect.

Further, in the oil catch apparatus according to the embodiment of the present invention, the buffer includes a buffer member formed in such a way as to cover up a portion of the main filter unit on a side opposite to an air inflow side. Thus, it is possible to suppress the oil and the like separated from air from splashing.

Further, in the oil catch apparatus according to the embodiment of the present invention, the main unit includes an exhaust opening for an air exiting from the peripheral surface of the main filter unit for clearance of impurities, and the lid includes an inlet into which an air flows and a drain outlet out of which the impurities are drained. Thus, it is possible to make the oil catch apparatus more compact.

Further, the oil catch apparatus according to the embodiment of the present invention further includes a cylindrical member that is attached to the lid. One side of the cylindrical member is coupled to the drain outlet and the other side of the cylindrical member is detachably mounted on a stop formed on the lid. Thus, the tubular member is attached to the stop when not in use, while it can be easily removed from the stop when in use, making it possible to easily use the tubular member.

BEST MODE FOR CARRYING OUT THE INVENTION

An embodiment of the present invention will be described below with reference to the drawings.

Figure 1:
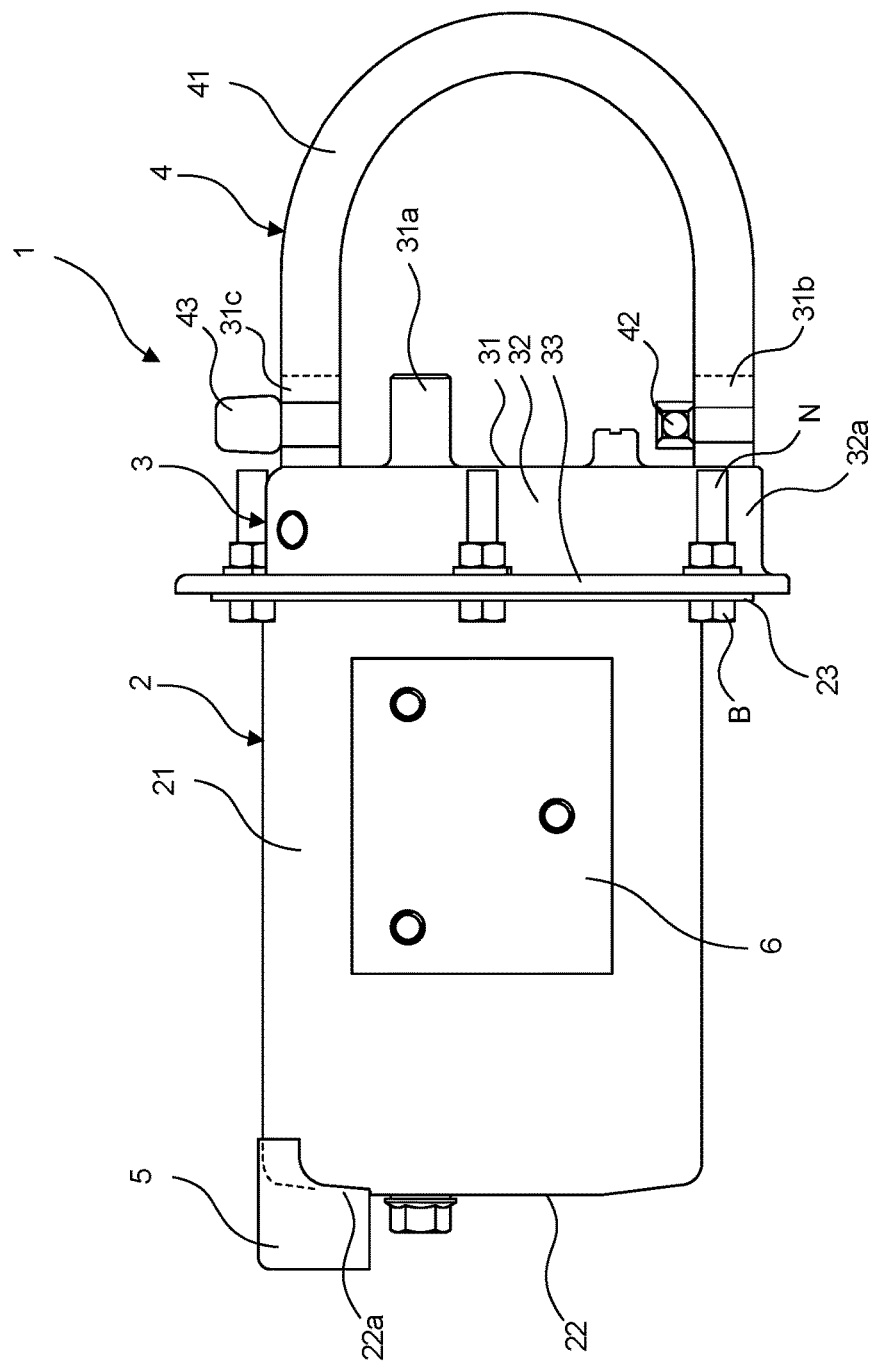
FIG. 1 is a front view of an oil catch apparatus according to an embodiment of the present invention.
Figure 2:
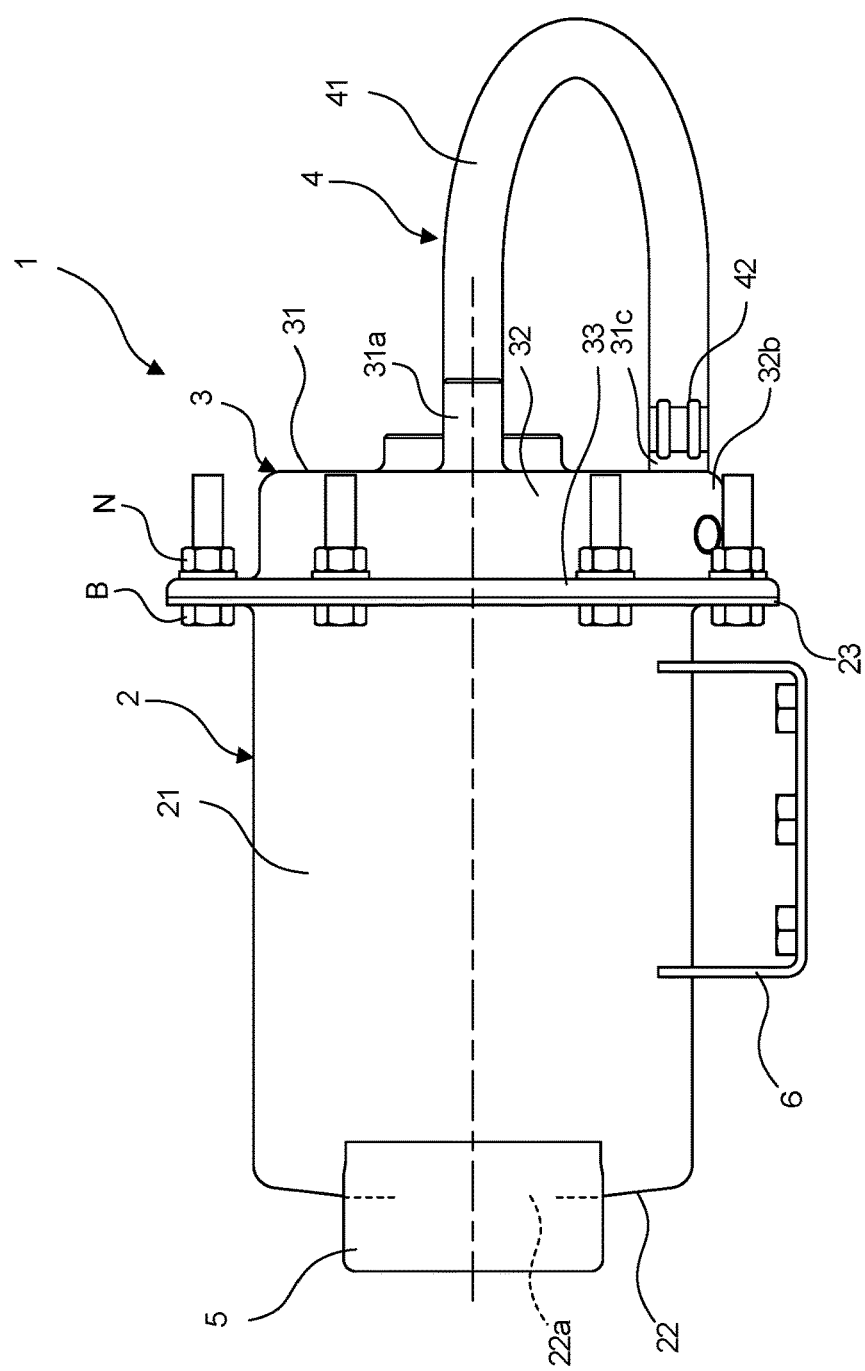
FIG. 2 is a side view of the oil catch apparatus according to the present embodiment.
Figure 3:
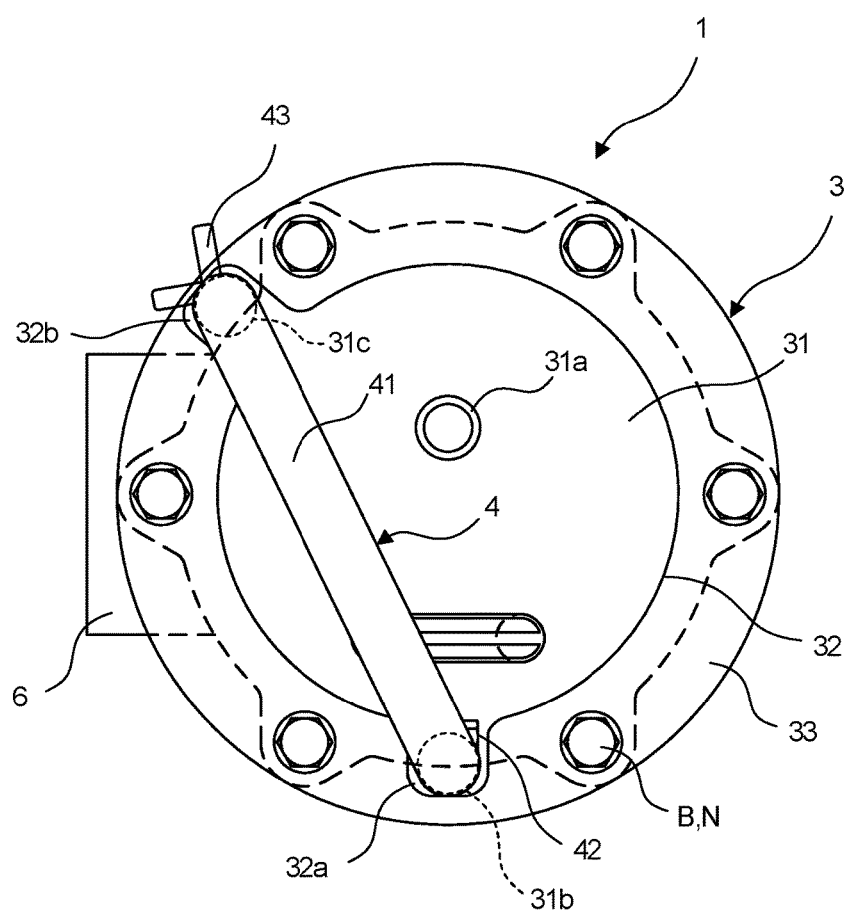
FIG. 3 is a plan view of the oil catch apparatus according to the present embodiment.

FIG. 1 is a front view of an oil catch apparatus 1 according to an embodiment of the present invention. FIG. 2 is a side view of the oil catch apparatus 1 according to the present embodiment. FIG. 3 is a plan view of the oil catch apparatus 1 according to the present embodiment.

The oil catch apparatus 1 according to the present embodiment includes a main unit 2, a lid 3 that covers the opening of the main unit 2, a hose 4 attached to the lid 3, an exhaust guide 5 that guides flow of exhaust air, and a mounting part 6 installed in the main unit 2.

The main unit 2 has a cylinder 21, a bottom part 22, and a main unit flange 23. Although the cylinder 21 is formed into a cylindrical shape, it may have a rectangular cylindrical shape or an elliptic cylindrical shape. The bottom part 22 is formed so as to close one opening of the cylinder 21. An exhaust opening 22a is formed in the bottom part 22. The main unit flange 23 protrudes outward from the cylinder 21 at a side opposite to the bottom part 22 in a direction perpendicular to the longitudinal direction of the main unit 2. Although the cylinder 21, bottom part 22, and flange part 23 may be formed separately and joined together by welding or the like, they are preferably formed integrally.

The lid 3 has a flat part 31, a side part 32, and a lid flange 33. The shape of the flat part 31 is preferably the same as that of the bottom part 22 of the main unit 2. An inlet 31a protrudes from the flat surface of the flat part 31 and has therein a hole penetrating therethrough in the same direction as the protruding direction thereof. The inlet 31a preferably protrudes in a direction perpendicular to the flat surface. The side part 32 extends in the vertical direction from the outer periphery of the flat part 31. The side part 32 has first and second protruding parts 32a and 32b protruding the side thereof. A drain outlet 31b protrudes from the flat surface of the side part 32 and has therein a hole penetrating therethrough in the same direction as the protruding direction thereof. A stop 31c protrudes from the flat surface of the second protruding part 32b. The first and second protruding parts 32a and 32b preferably protrude in a direction perpendicular to the side surface. The lid flange 33 protrudes outward from the side part 32 at a side opposite to the flat part 31 in a direction perpendicular to the longitudinal direction of the main unit 2. Although the flat part 31, side part 32, and lid flange 33 may be formed separately and joined together by welding or the like, they are preferably formed integrally.

Coupling holes 23a and 33a through each of which a bolt B for coupling the main unit 2 and lid 3 penetrates are formed in the main unit flange 23 and lid flange 33, respectively. The bolt B penetrating through each of the coupling holes 23a and 33a is fastened by a nut N. Although the bolt B and nut N are used as a coupling part for coupling the main unit 2 and lid 3 in the present embodiment, another structure may be used.

The hose 4 has a tubular member 41 made of a transparent or translucent soft material. One side of the tubular member 41 is coupled to the drain outlet 31b of the lid 3 by a first clip 42 or the like. The other side of the tubular member 41 is normally attached to the stop 31c by a second clip 43 or the like and is removed when oil or the like is discharged from the drain outlet 31b.

By installing the hose 4 in this manner, it is possible to confirm the amount of oil or the like accumulated in the transparent or translucent tubular member 41. Further, the tubular member 41 is attached to the stop 31c by the second clip 43 when not in use, while it can be used by removing the second clip 43 when in use. That is, the tubular member 41 can be easily used in an attachable/detachable manner.

The exhaust guide 5 is installed to the cylinder 21 so as to cover the exhaust opening 22a formed in the bottom part 22 of the main unit 2 with its eaves. The exhaust guide 5 guides exhaust gas exhausted from the exhaust opening 22a.

By installing the exhaust guide 5 in this manner, it is possible to guide exhaust gas properly.

The mounting part 6 is installed to the cylinder 21 of the main unit 2. The main unit 2 is mounted to a not illustrated vehicle body through the mounting part 6.

Figure 4:
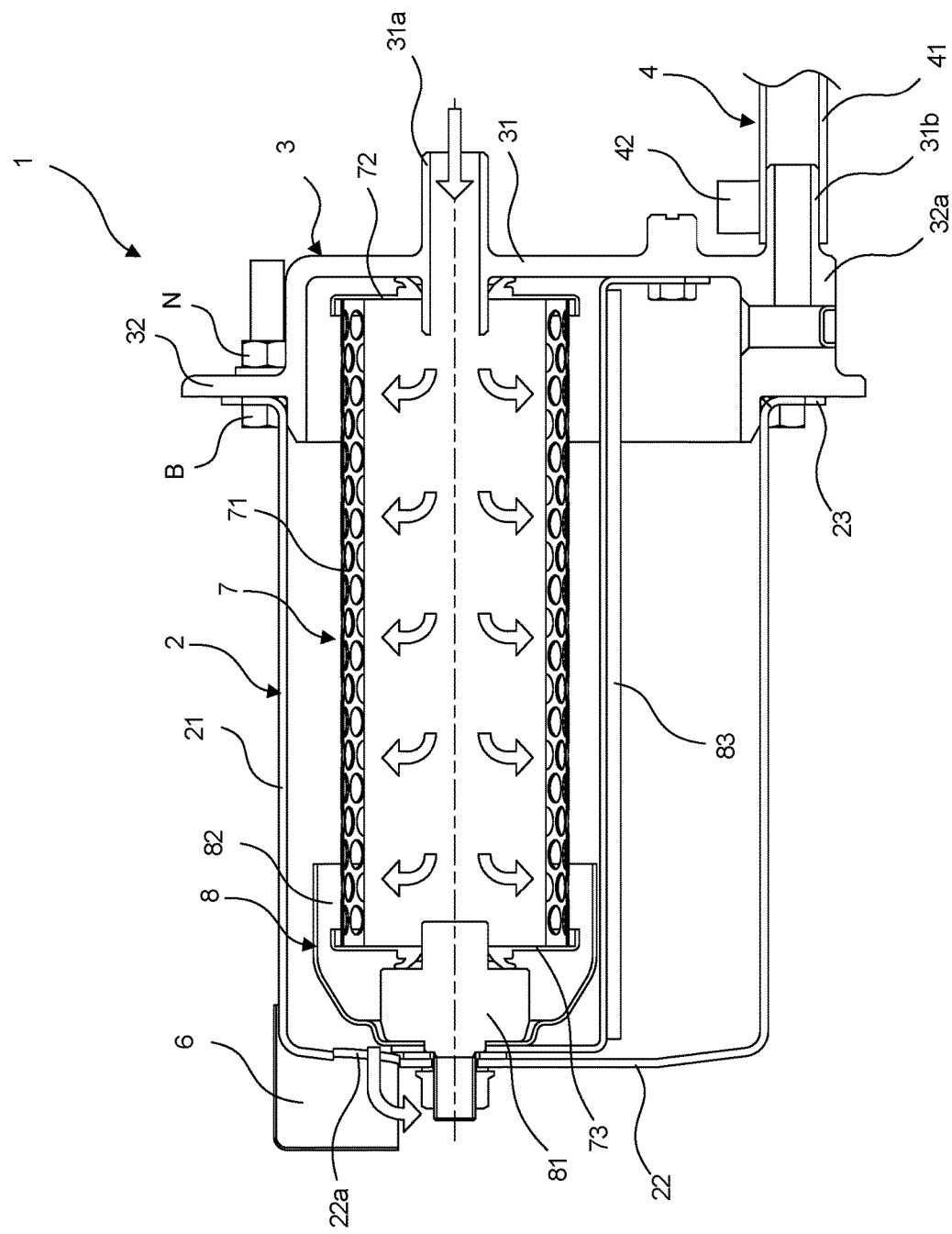
FIG. 4 is a cross-sectional view of the oil catch apparatus according to the present embodiment.

FIG. 4 is a cross-sectional view of the oil catch apparatus 1 according to the present embodiment.

The oil catch apparatus 1 has inside thereof a filter 7 and a buffer 8 supporting the filter 7.

The filter 7 has a main filter unit 71, a first keep member 72, and a second keep member 73. The main filter unit 71 is formed by stacking a network stainless material and a polyester mesh and winding the stack in a cylindrical shape. The first and second keep members 72 and 73 keep the both ends of the cylindrical main filter unit 71, respectively, to thereby keep the winding state of the main filter unit 71. A first insertion opening 72a into which the inlet 31a protruding inside the lid 3 is inserted is formed at the center of the first keep member 72, and a second insertion opening 73a into which a filter support member 81 to be described later is inserted formed at the center of the second keep member 73. A muffler may be provided inside the main filter unit 71.

By installing the thus configured filter 7, it is possible to efficiently separate and collect oil and the like within a limited space. Further, by using the stainless material, it is possible to manufacture the filter 7 at lost cost. Furthermore, by using the mesh, muffling effect can be enhanced.

The buffer 8 has a filter support member 81, a buffer member 82, and a buffer mounting member 83. The filter support member 81 supports the second keep member 73 and mounted to the main unit 2 together with the buffer member 82 and buffer mounting member 83. The buffer member 82 is formed into a substantially hemispherical shape so as to cover a portion of the main filter unit 71 on the side opposite to the inlet 31a. A third insertion opening 82a into which the filter support member 81 is inserted is formed at the center of the buffer member 82. The buffer mounting member 83 is supported by the filter support member 81 at one end thereof and supported by the lid 3 at the other end thereof.

By installing the buffer 8, it is possible to suppress the oil and the like separated from air from splashing.

Next, the air flow and oil collection will be described.

Air flowing in the oil catch apparatus 1 from the inlet 31a flows inside the main filter unit 71 is cleared of the oil and the like upon passing through the main filter unit 71. The air on the outer peripheral side of the main filter unit 71 is in a purified state where the oil and the like have been separated. The purified air is exhausted from the exhaust opening 22a. The oil and the like separated in the main filter unit 71 fall downward to be accumulated temporarily in the cylinder 21 of the main unit 2. Thereafter, the other side of the tubular member 41 is removed from the stop 31c to be positioned below the drain outlet 31b, whereby the oil and the like are discharged from the drain outlet 31b.

Figure 5:
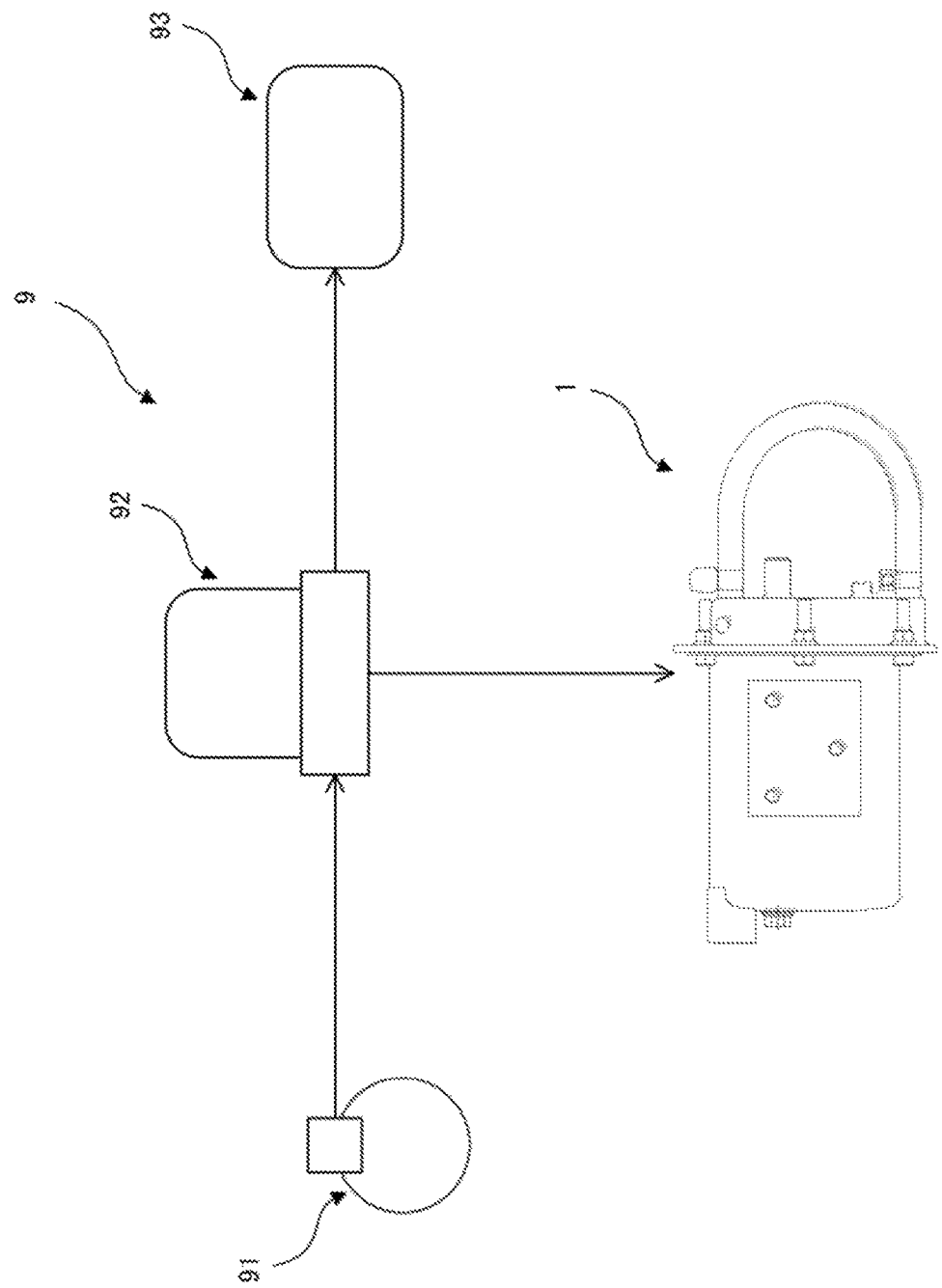
FIG. 5 illustrates an air treatment system using the oil catch apparatus according to the present embodiment.

FIG. 5 illustrates an air treatment system 9 using the oil catch apparatus 1 according to the present embodiment.

The air treatment system 9 according to the present embodiment controls a braking system or the like using compressed air fed from a compressor 91. The compressed air exhausted from the compressor 91 is fed to an air dryer 92. The air dryer 92 removes the oil and the like contained in the compressed air and feds the resultant dry air to an air tank 93.

Direct disposal of the oil and the like removed by the air dryer 92 can greatly affect environment, so that the oil and the like are separated and collected by the oil catch apparatus 1 according to the present embodiment.

As described above, the oil catch apparatus 1 includes the main unit 2, lid 3 that covers the opening of the main unit 2, filter 7 installed inside the main unit 2, and buffer 8 that supports the filter 7. The filter 7 has the cylindrically-wound main filter unit 71 and keep members 72 that keep the both ends of the main filter unit 71. Air flowing inside the main filter unit 71 is cleared of the oil and the like upon passing through the main filter unit 71 and exits from the outer peripheral side of the main filter unit 71. Thus, the oil catch apparatus 1 can extract a sufficient amount of oil albeit being of compact size.

Further, in the oil catch apparatus 1 according to the present embodiment, the main filter unit 71 is formed by stacking a stainless mesh material and a polyester mesh and winding the stack in a cylindrical shape. Thus, using the thus configured filter 7 makes it possible to efficiently separate and collect the oil and the like within a limited space. Further, using the stainless material allows the filter 7 to be manufactured at low cost. Further, using the mesh makes it possible to enhance muffling effect.

Further, in the oil catch apparatus 1 according to the present embodiment, the buffer 8 has the buffer member 82 formed so as to cover a portion of the main filter unit 71 on the side opposite to the air inflow side, making it possible to suppress the oil and the like separated from air from splashing.

Further, in the oil catch apparatus 1 according to the present embodiment, the main unit 2 has the exhaust opening 22a through which the purified air passing the main filter unit 71 on the outer peripheral side thereof is exhausted, and the lid 3 has the inlet 31a through which air flows in the oil catch apparatus 1 and drain outlet 31b through which impurities are discharged, thus making it possible to make the oil catch apparatus 1 more compact.

Further, the oil catch apparatus 1 according to the present embodiment includes the tubular member 41 attached to the lid 3. One side of the tubular member 41 is coupled to the drain outlet 31b, and the other side of the tubular member 41 is detachably attached to the stop 31c formed in the lid 3.

Thus, the tubular member 41 is attached to the stop 31c when not in use, while it can be easily removed from the stop 31c when in use, making it possible to easily use the tubular member 41.

While the various embodiments of the present invention have been described, the present invention is not limited to these embodiments, and various modifications are possible within the scope of the invention. For example, a configuration obtained by appropriately modifying each embodiment and a configuration appropriately combining configurations of the different embodiments are also included in the technical scope of the present invention.

REFERENCE SIGNS LIST

1: Oil catch apparatus
2: Main unit
21: Cylinder
22: Bottom part
23: Main unit flange
3: Lid
31: Flat part
32: Side part
33: Lid flange
4: Hose
41: Tubular member
42: First clip
43: Second clip
5: Exhaust guide
6: Mounting part
7: Filter
71: Main filter unit
72: First keep member
73: Second keep member
8: Buffer
81: Filter support member
82: Buffer member
83: Buffer mounting member

What we claim is:

1. An oil catch apparatus, comprising:
a main unit,
a lid configured to cover an opening in the main unit,
a filter located inside of the main unit,
a buffer arranged to support the filter, and
a cylindrical member configured to be attached to the lid,
wherein
the filter includes a cylindrically wound main filter unit and a keep member configured to keep both ends of the main filter unit,
air passing through the main filter unit is cleared of impurities and exits from a peripheral surface of the main filter unit,
the buffer includes a buffer member configured to cover up a portion of the main filter unit on a side opposite to an air inflow side, and
one side of the cylindrical member is coupled to the drain outlet and the other side of the cylindrical member is detachably mounted on a stop formed on the lid.

2. The oil catch apparatus according to claim 1, wherein the main filter unit is formed from winding a network stainless material cylindrically and an inside polyester mesh.

3. The oil catch apparatus according to claim 2, wherein the buffer includes a buffer member configured to cover up a portion of the main filter unit on a side opposite to an air inflow side.

4. The oil catch apparatus according to claim 1, wherein
the main unit includes an exhaust opening for air from which impurities have been removed to exit from the peripheral surface of the main filter unit, and
the lid includes an inlet and a drain outlet arranged to permit draining out impurities.

5. The oil catch apparatus according to claim 2, wherein
the main unit includes an exhaust opening for air from which impurities have been removed to exit from the peripheral surface of the main filter unit, and
the lid includes an inlet and a drain outlet arranged to permit draining out impurities.

6. The oil catch apparatus according to claim 3, wherein
the main unit includes an exhaust opening for air from which impurities have been removed to exit from the peripheral surface of the main filter unit, and
the lid includes an inlet and a drain outlet arranged to permit draining out impurities.

* * * * *